US012697903B2

(12) United States Patent　　　　　(10) Patent No.:　US 12,697,903 B2

Kume et al.　　　　　　　　　　　　(45) Date of Patent:　　　Aug. 4, 2026

(54) SEAT CONTROL DEVICE, STATE ESTIMATION DEVICE, AND NON-TRANSITORY COMPUTER-READABLE MEDIUM

(71) Applicant: DENSO CORPORATION, Kariya-city (JP)

(72) Inventors: Takuya Kume, Kariya-city (JP); Kazuki Izumi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 237 days.

(21) Appl. No.: 18/512,987

(22) Filed: Nov. 17, 2023

(65) Prior Publication Data

US 2024/0083308 A1　　Mar. 14, 2024

Related U.S. Application Data

(63) Continuation of application No. PCT/JP2022/020384, filed on May 16, 2022.

(30) Foreign Application Priority Data

Jun. 3, 2021　(JP) ................................. 2021-093879

(51) Int. Cl.
*B60N 2/20*　　　(2006.01)
*B60N 2/02*　　　(2006.01)
*B60Q 9/00*　　　(2006.01)

(52) U.S. Cl.
CPC ............. *B60N 2/20* (2013.01); *B60N 2/0268* (2023.08); *B60N 2/0273* (2023.08); *B60Q 9/00* (2013.01)

(58) Field of Classification Search
CPC ...... B60N 2/20; B60N 2/0268; B60N 2/0273; B60Q 9/00
See application file for complete search history.

(56) References Cited

U.S. PATENT DOCUMENTS

2013/0009761 A1　1/2013　Horseman
2013/0009993 A1　1/2013　Horseman
2013/0011819 A1　1/2013　Horseman
(Continued)

FOREIGN PATENT DOCUMENTS

JP　　2005108033 A　　4/2005
JP　　2014520607 A　　8/2014
(Continued)

*Primary Examiner* — Hunter B Lonsberry
*Assistant Examiner* — Besufekad Lemma Tessema
(74) *Attorney, Agent, or Firm* — Harness, Dickey & Pierce, P.L.C.

(57)　　　　　　ABSTRACT

A seat control device is for a subject vehicle equipped with a driver monitor. The driver monitor is configured to monitor a driver's state. The seat control device is configured to control a state of a driver's seat on which a driver is to be seated. The seat control device includes a control grasping unit and a reclining control unit. The control grasping unit is configured to grasp whether the subject vehicle travels under an automated driving control that does not oblige the driver to monitor surroundings. The reclining control unit is configured to, when the subject vehicle travels under the automated driving control, control a reclining state of the driver's seat, such that the driver is included in a detection range of the driver monitor.

13 Claims, 5 Drawing Sheets

(56)                References Cited

U.S. PATENT DOCUMENTS

| | | | |
|---|---|---|---|
| 2013/0012786 A1 | 1/2013 | Horseman | |
| 2013/0012787 A1 | 1/2013 | Horseman | |
| 2013/0012788 A1 | 1/2013 | Horseman | |
| 2013/0012789 A1 | 1/2013 | Horseman | |
| 2013/0012790 A1 | 1/2013 | Horseman | |
| 2013/0012802 A1 | 1/2013 | Horseman | |
| 2013/0013327 A1 | 1/2013 | Horseman | |
| 2013/0013331 A1 | 1/2013 | Horseman | |
| 2014/0019165 A1 | 1/2014 | Horseman | |
| 2014/0025396 A1 | 1/2014 | Horseman | |
| 2014/0025397 A1 | 1/2014 | Horseman | |
| 2014/0163330 A1 | 6/2014 | Horseman | |
| 2014/0163331 A1 | 6/2014 | Horseman | |
| 2014/0163332 A1 | 6/2014 | Horseman | |
| 2014/0163333 A1 | 6/2014 | Horseman | |
| 2014/0163335 A1 | 6/2014 | Horseman | |
| 2014/0163336 A1 | 6/2014 | Horseman | |
| 2014/0163337 A1 | 6/2014 | Horseman | |
| 2015/0012186 A1 | 1/2015 | Horseman | |
| 2016/0159251 A1* | 6/2016 | Ebina | B60N 2/0025 701/49 |
| 2017/0161576 A1 | 6/2017 | Banno et al. | |
| 2017/0313314 A1* | 11/2017 | Sen | B60W 50/082 |
| 2017/0334451 A1* | 11/2017 | Asakura | B60W 10/04 |
| 2018/0292821 A1* | 10/2018 | Minato | G05D 1/0061 |
| 2019/0054928 A1* | 2/2019 | Hatano | B60W 50/14 |
| 2019/0090816 A1 | 3/2019 | Horseman | |
| 2019/0269369 A1 | 9/2019 | Horseman | |
| 2019/0299897 A1* | 10/2019 | Gramenos | B60N 2/4279 |
| 2019/0347499 A1* | 11/2019 | Yanagawa | G06V 20/597 |
| 2020/0057898 A1* | 2/2020 | Banno | G06T 7/73 |
| 2020/0255007 A1 | 8/2020 | Tsuji et al. | |
| 2020/0307642 A1 | 10/2020 | Tsuji et al. | |
| 2021/0158064 A1 | 5/2021 | Banno et al. | |

FOREIGN PATENT DOCUMENTS

| | | | |
|---|---|---|---|
| JP | 2015194798 A | | 11/2015 |
| JP | 2017197011 A | | 11/2017 |
| JP | 2017222271 A | | 12/2017 |
| JP | 2018173996 A | | 11/2018 |
| JP | 2019087874 A | * | 6/2019 |
| JP | 2020128167 A | | 8/2020 |
| JP | 2020158090 A | | 10/2020 |
| JP | 2020164075 A | | 10/2020 |
| WO | WO-2015011866 A1 | | 1/2015 |

* cited by examiner

SEAT CONTROL DEVICE, STATE ESTIMATION DEVICE, AND NON-TRANSITORY COMPUTER-READABLE MEDIUM

CROSS REFERENCE TO RELATED APPLICATION

The present application is a continuation application of International Patent Application No. PCT/JP2022/020384 filed on May 16, 2022, which designated the U.S. and claims the benefit of priority from Japanese Patent Application No. 2021-093879 filed on Jun. 3, 2021. The entire disclosures of all of the above applications are incorporated herein by reference.

TECHNICAL FIELD

The present disclosure relates to a seat control device, a non-transitory computer-readable medium storing a seat control program, a state estimation device, and a non-transitory computer-readable medium storing a state estimation program.

BACKGROUND

Conventionally, an automated driving device to assist a driver to drive a vehicle has been developed.

SUMMARY

According to an aspect of the present disclosure, a subject vehicle is equipped with a driver monitor to monitor a driver's state. A seat control device for the subject vehicle is configured to control a state of a driver's seat.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
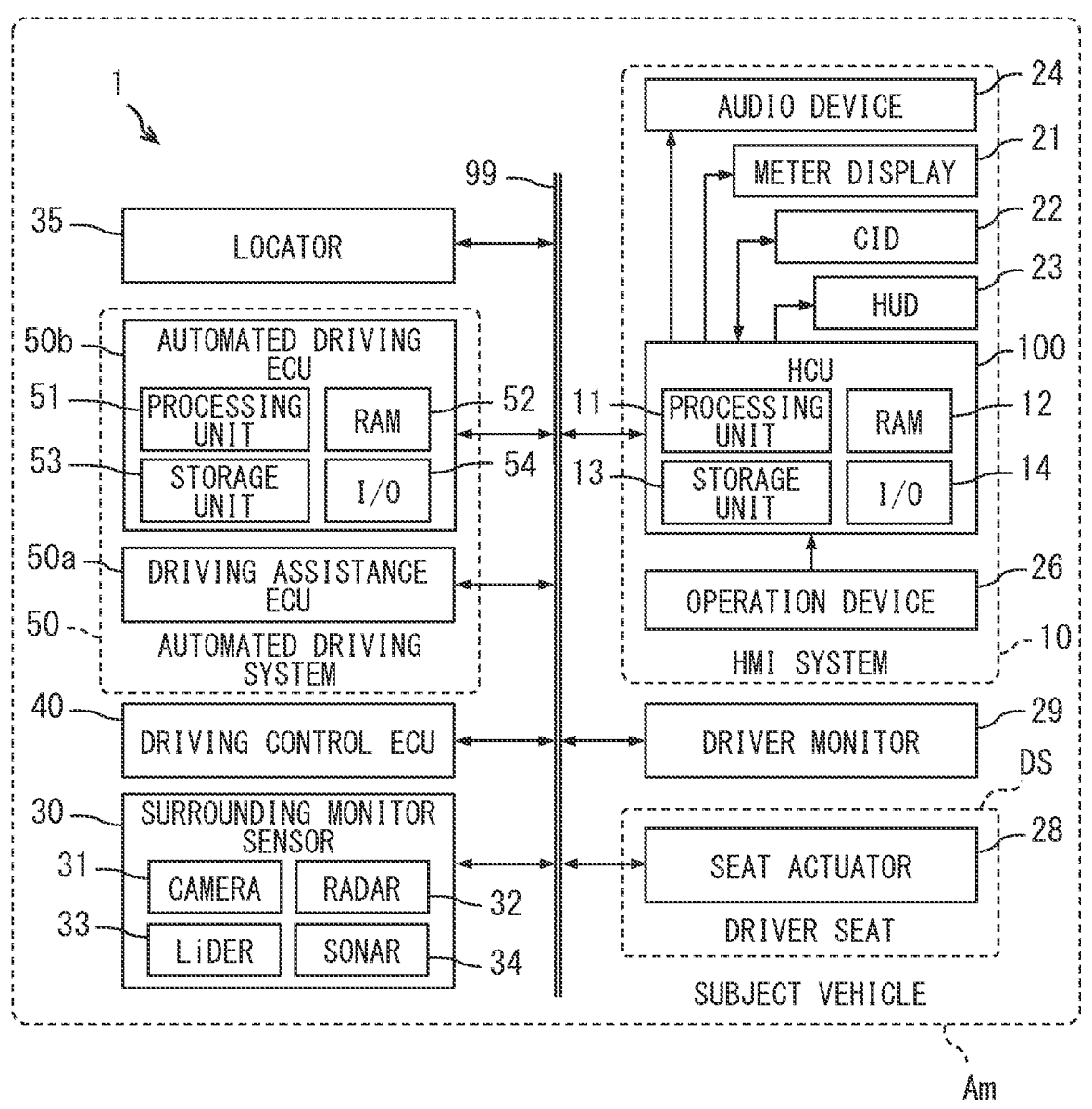
FIG. 1 is a diagram illustrating a whole image of an in-vehicle network including an HCU according to a first embodiment of the present disclosure.

Hereinafter, examples of the present disclosure will be described.

A control device according to an example of the preset disclosure enables automated driving without obligation on a driver to monitor surroundings by performing all driving operations. This control device determines whether the driver's state is abnormal based on an image captured by an occupant monitoring device that monitors the driver's state and a detection signal. When the control device determines that an abnormality occurs and that the automated driving can be hardly continued, the control device performs vehicle control to stop the vehicle at an evacuation site such as a roadside or a parking area.

When the driver is obligated to monitor the surroundings, the driver's head position, the face direction, and the like may generally fall within a predetermined region. However, when the driver is not obligated to monitor the surroundings, the driver may lose a driving posture or may operate a mobile terminal. Consequently, when there is no obligation to monitor the surroundings, there is a possibility that the driver moves more significantly than when there is an obligation to monitor the surroundings. As a result, there is a possibility that monitoring of the driver's state is hardly continued.

According to an aspect of the present disclosure, a seat control device is for a subject vehicle equipped with a driver monitor to monitor a driver's state. The seat control device is configured to control a state of a driver's seat on which a driver is to be seated. The seat control device comprises: a control grasping unit configured to grasp whether the subject vehicle travels under an automated driving control that does not oblige the driver to monitor surroundings; and a reclining control unit configured to, when the subject vehicle travels under the automated driving control, control a reclining state of the driver's seat, such that the driver is included in a detection range of the driver monitor.

According to, another aspect of the present disclosure, a non-transitory computer-readable medium stores a seat control program for a subject vehicle equipped with a driver monitor to monitor a driver's state. The seat control program is configured to control a state of a driver's seat on which a driver is to be seated. The seat control program comprises instructions configured to, when executed by a processor, to cause the processor to: grasp whether the subject vehicle travels under an automated driving control that does not oblige the driver to monitor surroundings; and control, when the subject vehicle travels under the automated driving control, a reclining state of the driver's seat, such that the driver is included in a detection range of the driver monitor.

In these examples, the reclining state of the driver's seat is controlled such that the driver is included in the detection range of the driver monitor. Therefore, even when the driver who has been released from the obligation to monitor the surroundings loses the driving posture, the driver is enabled to remain within the detection range of the driver monitor by the reclining control. As a result, the configuration enables to suppress interruption of the driver's state monitoring in the automated driving period in which obligation to monitor the surroundings does not exist.

According to an aspect of the present disclosure, a state estimation device is for a subject vehicle configured to travel under an automated driving control that does not oblige a driver to monitor surroundings. The state estimation device is configured to estimate a driver's state and comprises: a monitoring state grasping unit configured to grasp, based on a driver captured image acquired by capturing a detection range defined to include at least a head of the driver seated on a driver's seat, head information, which relates to a shape of a head in the driver captured image, and face information, which relates to parts of a face in the driver captured image; and a driver state estimation unit configured to, when the subject vehicle travels under the automated driving control, estimate the driver's state by combining the head information and the face information.

According to another aspect of the present disclosure, a non-transitory computer-readable medium stores a state estimation program for a subject vehicle configured to travel under an automated driving control that does not oblige a driver to monitor surroundings. The state estimation program is configured to estimate a driver's state. The state estimation program comprises instructions configured to, when executed by a processor, to cause the processor to: grasp, based on a driver captured image acquired by capturing a detection range defined to include at least a head of the driver seated on the driver's seat, head information, which relates to a shape of a head in the driver captured image, and face information, which relates to parts of a face in the driver captured image; and estimate, when the subject vehicle travels under the automated driving control, a state of the driver by combining the head information and the face information.

In these examples, when the subject vehicle travels under the automated driving control, the driver's state is estimated by combining the head information and the face information. Therefore, even when the driver, who has been released from the obligation of monitoring the surroundings, looks down to operate a mobile device and the like, the face information, which is hardly grasped, can be supplemented with the head information. As a result, the configuration enables to suppress interruption of the driver state monitoring in the automated driving period in which obligation to monitor the surroundings does not exist.

Hereinafter, embodiments of the present disclosure will be described.

Figure 2:
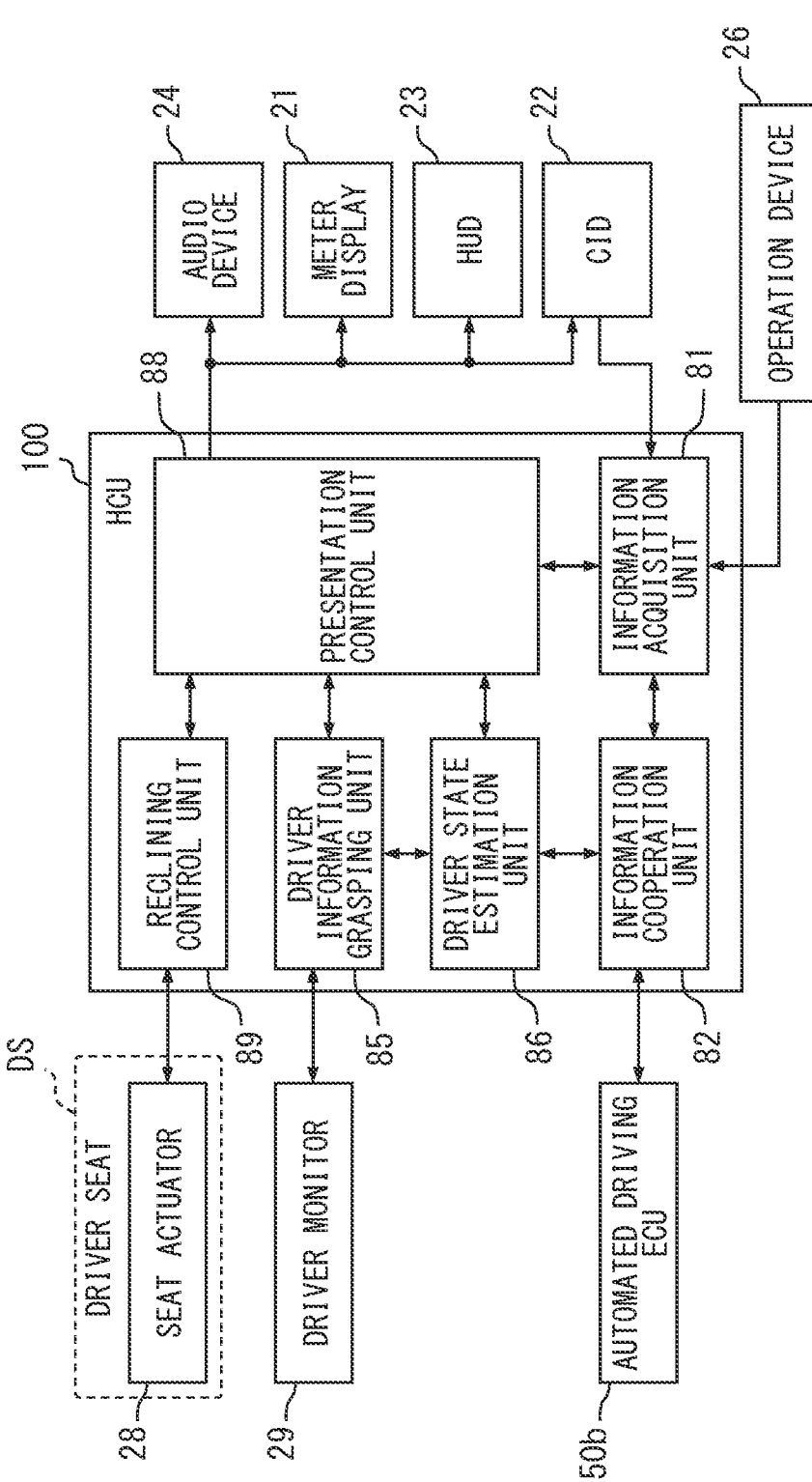
FIG. 2 is a block diagram showing details of the HCU.

An HCU (Human Machine Interface Control Unit) according to an embodiment of the present disclosure shown in FIGS. 1 and 2 is an interface control device used in a vehicle (hereinafter referred to as subject vehicle Am). An HCU 100 constitutes a human machine interface (HMI) system 10 of the subject vehicle Am together with multiple display devices, an audio device 24, an operation device 26, and the like. The HMI system 10 has an input interface function for receiving operations performed by an occupant such as the driver of the subject vehicle Am, and an output interface function for presenting information to the driver.

The HCU 100 is communicably connected to a communication bus 99 of an in-vehicle network 1 mounted on the subject vehicle Am. The HCU 100 is one of nodes connected to the in-vehicle network 1. A surrounding monitoring sensor 30, a locator 35, a driving control ECU (Electronic Control Unit) 40, a driving assistance ECU 50a, an automated driving ECU 50b, and the like are connected as nodes to the communication bus 99 of the in-vehicle network 1. Furthermore, a seat actuator 28, a driver monitor 29, and the like are connected to the communication bus 99. These nodes connected to the communication bus 99 are capable of communicating with each other. It should be noted that specific nodes among the multiple devices and the multiple ECUs and the like may be directly electrically connected with one another and can communicate with one other without using the communication bus 99.

The surrounding monitoring sensor 30 is an automated sensor that monitors a surrounding environment of the subject vehicle Am. The surrounding monitoring sensor 30 includes, for example, one or multiple of camera units 31, millimeter wave radars 32, lidars 33, and sonars 34. The surrounding monitoring sensor 30 can detect a moving object and a stationary object from a detection range in the surroundings of the subject vehicle. The surrounding monitoring sensor 30 provides detection information of an object in the surroundings of the subject vehicle to the driving assistance ECU 50a, the automated driving ECU 50b, and the like.

The locator 35 includes a global navigation satellite system (GNSS) receiver, an inertial sensor, and the like. The locator 35 further includes a map database storing three-dimensional map data and two-dimensional map data. The locator 35 reads map data around the current location from the map database, and provides the map data, as locator information, to the driving assistance ECU 50a, the automated driving ECU 50b, and the like together with position information and direction information of the subject vehicle Am.

The driving control ECU 40 is an electronic control device mainly including a microcontroller. The driving control ECU 40 has at least functions of a brake control ECU, a drive control ECU, and a steering control ECU. The driving control ECU 40 continuously controls a braking force of each wheel, an output of an in-vehicle power source, and a steering angle based on any one of control commands based on a driving operation of the driver, a control command of the driving assistance ECU 50a, and a control command of the automated driving ECU 50b.

The driving assistance ECU 50a and the automated driving ECU 50b constitute an automated driving system 50 of the subject vehicle Am. The subject vehicle Am serves as an automated driving vehicle including an automated driving function by mounting the automated driving system 50, and can travel by the automated driving function.

The driving assistance ECU 50a implements a driving assistance function for assisting a driving operation of a driver in the automated driving system 50. The driving assistance ECU 50a enables advanced driving assistance of about level 2 or partial automated driving at automated driving levels defined by the Society of Automotive Engineers. automated driving performed by the driving assistance ECU 50a is automated driving with a surroundings monitoring obligation that obliges monitoring of the surroundings of the subject vehicle by visual observation of the driver.

The driving assistance ECU 50a is a computer mainly including a control circuit including a processing unit, a RAM, a storage unit, an input and output interface, a bus connecting the processing unit, the RAM, the storage unit, and the input and output interface, and the like. The driving assistance ECU 50a implements driving assistance functions such as ACC (Adaptive Cruise Control), LTC (Lane Trace Control) and LCA (Lane Change Assist) by executing programs in the processor. In one example, the driving assistance ECU 50a implements driving assistance control for causing the subject vehicle Am to travel along the subject vehicle lane Lns in which the vehicle Am is traveling, in cooperation with each of the functions ACC and LTC.

The automated driving ECU 50b is an in-vehicle ECU that implements an automated driving function capable of substituting a driving operation of the driver. The automated driving ECU 50b can perform automated driving of level 3 or higher in which the system is a control subject. The automated driving performed by the automated driving ECU 50b is automated driving that does not need to monitor the surroundings of the subject vehicle, that is, eyes-off automated driving with no surroundings monitoring obligation.

The automated driving ECU 50b is a computer mainly including a control circuit including a processor 51, a RAM 52, a storage 53, an I/O interface 54, a bus connecting them, and the like. The automated driving ECU 50b has the higher calculation capability than the driving assistance ECU 50a, and can execute at least travel control corresponding to ACC, LTA, and LCA. The automated driving ECU 50b implements, in a preset automated driving area (hereinafter referred to as AD area, see FIG. 5), and when a traffic congestion around your vehicle is detected, automated driving control (hereinafter referred to as traffic-congestion level 3) that is implemented only when traveling in a traffic congestion.

In the automated driving system 50, a traveling control state of the automated driving function is switched between multiple controls including at least driving assistance control with surroundings monitoring obligation by the driving assistance ECU 50a and driving assistance control with no surroundings monitoring obligation by the automated driving ECU 50b. In the following description, the automated driving control of level 2 or lower by the driving assistance ECU 50a may be described as "driving assistance control", and the automated driving control of level 3 or higher by the automated driving ECU 50b may be described as "automated driving control".

In an automated driving period in which the subject vehicle Am travels under the automated driving control of the automated driving ECU 50b, a specific action (hereinafter, referred to as a second task) other than predetermined driving can be permitted by the driver. The second task is legally permitted for the driver until a request for a driving operation occurs, that is, a request for driving takeover occurs. This request is performed by the automated driving ECU 50b and the HCU 100 in cooperation. Assumed examples of the second task include viewing entertainment content such as moving image content, operation of a device such as a smartphone, and action such as eating.

The seat actuator 28 is a driving device that adjusts a seat position of a driver's seat DS. The seat actuator 28 has a function to move a position of a seating surface of the driver's seat DS in a front-rear direction and a left-right direction and a function to change an angle of a backrest of the driver's seat DS relative to the seating surface (hereinafter referred to as reclining angle). Additionally, the seat actuator 28 includes position sensors that detect the position and the reclining angle of the seating surface.

The seat actuator 28 adjusts the position and the reclining angle of the seating surface based on an operation by the driver and a control signal input from the HCU 100. In addition, the seat actuator 28 provides, as seat information indicating the state of the driver's seat DS, the position information of the seating surface and the reclining angle information detected by each position sensor to the HCU100 and the like.

The driver monitor 29 is mounted on the subject vehicle Am and monitors the state of the driver of the subject vehicle Am. The driver monitor 29 includes a near-infrared light source, a near-infrared camera, and a control unit that controls the near-infrared light source and the near-infrared camera. The driver monitor 29 is installed, for example, on a top surface of a steering column or on a top surface of an instrument panel, such that the near-infrared camera faces an upper side of the backrest of the driver's seat DS, specifically, faces the headrest. The near-infrared camera is integrated with a meter display 21 or a center information display (hereinafter, referred to as CID) 22, and the like, and is provided to a screen of any of the devices.

The driver monitor 29 uses the near-infrared camera to capture the driver's head radiated with near-infrared light by the near-infrared light source. A detection range (imaging range) of the near-infrared camera is predefined in a range approximately centered on the headrest portion, such that at least the driver's head seated in the driver's seat DS is included. An image captured by the near-infrared camera (hereinafter referred to as a driver captured image) is subjected to image processing or image analysis by a control unit. The control unit may be capable of extracting information such as a position of the driver's eye point and a line of the sight direction from the captured image of the driver. The driver monitor 29 provides, as driver state information, at least one of the captured image of the driver and the information extracted from the image to the HCU 100, the automated driving ECU 50b, and the like.

Next, the details of each of a plurality of display devices, the operation device 26, and the HCU 100 included in the HMI system 10 will be described in order.

The display device presents information by implementing image display or the like through the driver's vision. The display device includes the meter display 21, the CID 22, and a head-up display (hereinafter, referred to as HUD) 23. The CID 22 has a function of a touch panel and detects a touch operation on a display screen by the driver or the like. The audio device 24 includes a plurality of speakers installed in a vehicle interior in a placement surrounding the driver's seat DS, and causes the speakers to reproduce a notification sound, a voice message, or the like in the vehicle interior.

The operation device 26 is an input unit that receives an operation of user, such as a driver or the like. For example, a user operation related to activation and stop of the automated driving function is input to the operation device 26. As an example, a driver input (hereinafter referred to as level 3 transition operation) to instruct the transition from the driving assistance control to the automated driving control is input to the operating device 26. The operation device 26 includes a steering switch provided on a spoke portion of the steering wheel, an operation lever provided on a steering column portion, a voice input device for recognizing an utterance content of the driver, and the like.

The HCU 100 comprehensively controls information presentation using a plurality of display devices and the audio device 24. In addition, HCU100 further has a function of a seat control device that cooperates with the seat actuator 28 to control the state of the driver's seat DS where the driver is seated and a function of a state estimation device that cooperates with the driver monitor 29 to estimate the driver's state.

The HCU 100 mainly includes a control circuit including a processing unit 11, a RAM 12, a storage unit 13, an I/O interface 14, a bus that connects them, and the like. The processing unit 11 is a hardware combined with the RAM 12, and executes arithmetic processing. The processing unit 11 includes at least one arithmetic core, such as a central processing unit (CPU) or a graphics processing unit (GPU). The processing unit 11 may further include a field-programmable gate array (FPGA), a neural network processing unit (NPU), an IP core having another dedicated function, and the like. The RAM 12 may include a video RAM for generating image data. The processing unit 11 accesses the RAM 12 and executes various processes for performing the presentation control method, the sheet control method, the state estimation method, and the like of the present disclosure. The storage unit 13 includes a non-volatile computer-readable medium. The storage unit 13 stores various programs (such as a seat control program and a state estimation program) executed by the processing unit 11.

The HCU 100 includes a plurality of functional units by causing the processing unit 11 to execute each program stored in the storage unit 13. The HCU 100 includes functional units such as an information acquisition unit 81, an information cooperation unit 82, a driver information grasping unit 85, a driver state estimation unit 86, a presentation control unit 88, and a reclining control unit 89 (see FIG. 2).

The information acquisition unit 81 acquires vehicle information (such as vehicle speed information, and the like) indicating the state of the subject vehicle Am from the communication bus 99. In addition, the information acquisition unit 81 acquires operation information indicating the contents of the user operation from the CID 22, the operation device 26, and the like.

The information cooperation unit 82 cooperates with the automated driving ECU 50*b* and enables sharing of information between the automated driving system 50 and the HCU 100. The information cooperation unit 82 provides the automated driving ECU 50*b* with operation information grasped by the information acquisition unit 81, driver estimation information (described later) estimated by the driver state estimation unit 86, and the like.

The information cooperation unit 82 recognizes the operation state of automated driving by the automated driving system 50 by acquiring control state information indicating the state of the automated driving function. Based on the control state information, the information cooperation unit 82 grasps whether the driving control in operation is the driving assistance control or the automated driving control, in other words, whether the driving control performed by the automated driving function requires the driver to have the obligation to monitor the surroundings. In addition, the information cooperation unit 82 grasps a transition schedule from the driving assistance control to the automated driving control, when the subject vehicle Am travels under the driving assistance control. The information cooperation unit 82 grasps a transition schedule from the automated driving control to the driving assistance control, when the subject vehicle Am travels under the automated driving control.

The driver information grasping unit 85 acquires, from the driver monitor 29, driver state information including at least one of the driver captured image and the extracted information. The driver information grasping unit 85 grasps the operating state of the driver monitor 29 based on the driver state information. As an example, the driver information grasping unit 85 grasps, when the driver's upper body is out of the detection range of the driver monitor 29, whether the driver monitor 29 is capable to detect the driver or not, in other words, grasps interruption of the driver detection by the driver monitor 29. When the driver information grasping unit 85 grasps interruption of the driver detection by the driver monitor 29, the driver information grasping unit 85 notifies the presentation control unit 88 of interruption of driver monitoring.

The driver information grasping unit 85 grasps, based on the driver state information, head information and face information which are based on the driver captured image. The head information is information related to the shape of the head in the captured image of the driver, and is information mainly extracted from a contour shape of the head. The face information is information related to parts of the face (such as, eyes, nose, mouth, and the like) in the captured image of the driver, and is information mainly extracted from the positional relationship among the parts.

The head information and face information may be generated by either the driver information grasping unit 85 or the driver monitor 29. For example, when the captured image of the driver is provided from the driver monitor 29 to the driver information grasping unit 85, the head information and the face information may all be prepared by the driver information grasping unit 85. Further, at least a part of the head information and face information may be generated by a control unit of the driver monitor 29 and may be provided, as the driver state information, to the driver information grasping unit 85.

The driver state estimation unit 86 grasps the state and the behavior of the driver based on the information grasped by the driver information grasping unit 85. The driver state estimation unit 86 grasps whether the driver is monitoring the surroundings of the subject vehicle Am, whether the driving posture is distorted, and the like. The driver state estimation unit 86 grasps the content of the second task performed by the driver during the automated driving period. Note that the driver state estimation unit 86 may be configured to further determine whether the steering wheel is being held, whether the physical condition of the driver is abnormal.

Figure 3:
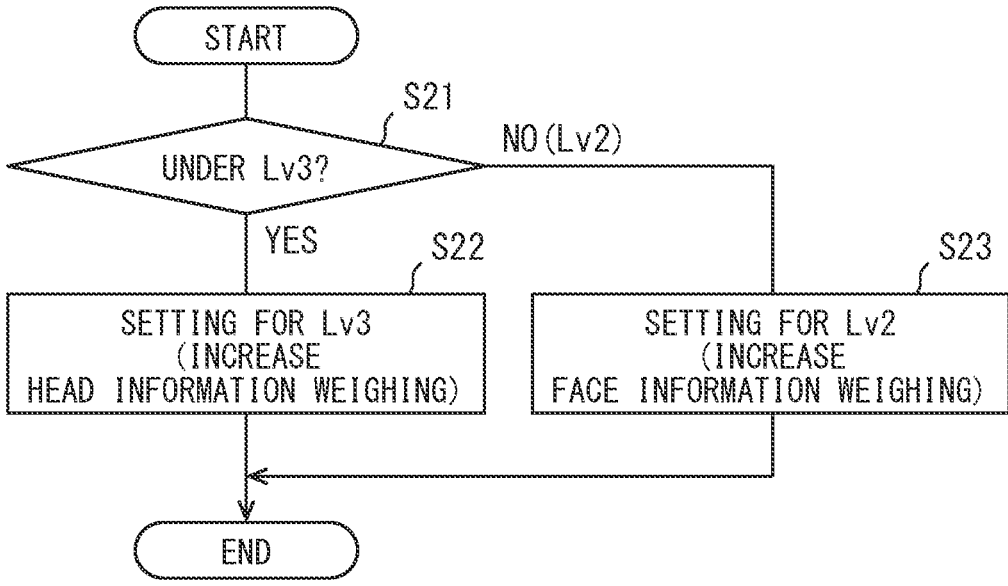
FIG. 3 is a flowchart showing details of a weighting change process.
Figure 4:
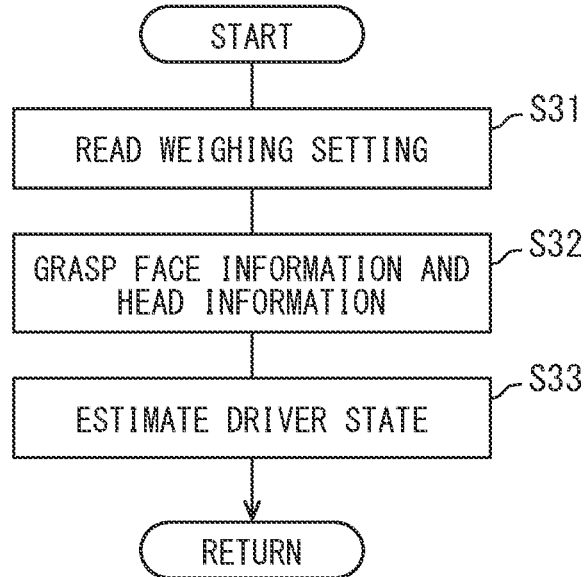
FIG. 4 is a flowchart showing details of a state estimation process.

The driver state estimation unit 86 cooperates with the information cooperation unit 82 and the driver information grasping unit 85 to perform a weighting change process (FIG. 3) and a state estimation process (FIG. 4). The weighting change process and the state estimation process are started by the HCU 100 that has completed its initial processing after the power of the subject vehicle Am is turned on, and are repeated until the power of the subject vehicle Am is turned off.

In the weighting change process, the driver state estimation unit 86 changes weighting of the head information and the face information in the driver state estimation between the case, in which the subject vehicle Am travels under the driving assistance control, and the case, in which the subject vehicle Am travels under the automated driving control. In the weighting change process, it is determined whether the level 3 automated driving control is being performed based on the control state information (S21).

When the level 3 automated driving control is being performed by the automated driving system 50 (S21: YES), the driver state estimation unit 86 selects settings for level 3 (S22). In the settings for level 3, the weighting of the head information is increased, and majority of the head information in the driver state estimation is higher than in the settings for level 2. In other words, influence of the head information on the driver state estimation is greater when the automated driving control is performed than when the driving assistance control is performed.

On the other hand, when the level 2 driving assistance control is being performed by the automated driving system 50 (S21: NO), the driver state estimation unit 86 selects setting for level 2 (S23). In the settings for level 2, the weighting of the head information is decreased, and majority of the face information in the driver state estimation is higher than in the settings for level 3.

In the state estimation process, the driver state estimation unit 86 estimates the state of the driver in the period in which the subject vehicle Am travels under the automated driving control or the driving assistance control. The driver state estimation unit 86 continues to grasp the driver's state by repeating the state estimation process. In the state estimation process, the driver state estimation unit 86 reads the settings of the weighting of the head information and the face information based on the weighting change process (S31). The step of reading the settings of the weighting need not be executed every time, and may be executed only once at a predetermined time.

The driver state estimation unit 86 cooperates with the driver information grasping unit 85 and grasps the face information and the head information based on the latest captured image of the driver (S32). The driver state estimation unit 86 combines the face information and the head information with a weighing that reflects the settings of the weighting as read, and estimates the driver's state (S33). Specifically, the driver state estimation unit 86 estimates, as the driver's state, the line of sight of the driver, whether the driver operates a mobile device, whether the driver is sleeping, whether the driver is drinking alcohol, and the like. The estimation result of the driver's state by the driver state estimation unit 86 is provided, as the driver estimation information, to the presentation control unit 88, the automated driving ECU 50b, and the like.

The presentation control unit 88 comprehensively controls provision of information to the driver using respective display devices and the audio device 24. The presentation control unit 88 provides contents and presents information in accordance with the operating state of the automated driving (see FIG. 5), based on the control state information acquired by the information cooperation unit 82, the driver's state information acquired by the driver information grasping unit 85, and the like.

Specifically, when approach to a traffic congestion is detected, while the subject vehicle Am is driving in the AD area under the level 2 driving assistance control, the presentation control unit 88 provides a level 3 approach notification by using the HUD 23, the meter display 21, and the like. The level 3 approach notification is a notification that indicates to the driver that the level 3 automated driving (traffic-congestion level 3) is likely to be available, and displays a message such as "second task available in traffic congestion ahead".

Further, when it is grasped that the subject vehicle Am enters a traffic congestion period, the presentation control unit 88 issues a level 3 availability notification. The level 3 availability notification indicates to the driver that the level 3 automated driving control becomes available. In the level 3 availability notification, for example, a message such as "second task is now available" is displayed.

After the level 3 availability notification is issued, when an input of the level 3 transition operation by the driver is grasped by the information acquisition unit 81, the presentation control unit 88 issues a level 3 start notification. The level 3 start notification indicates start of the level 3 automated driving control to the driver. In the Level 3 start notification, a message such as "Please pay attention to information from the vehicle. Automated driving will be canceled depending on surrounding road conditions" is displayed. Specifically, when the information cooperation unit 82 recognizes that the automated driving ECU 50b executes the automated driving control, the presentation control unit 88 enables reproduction of video contents by the CID 22 and the like.

When the driver monitor 29 cannot detect the driver after starting the automated driving control, the presentation control unit 88 issues a posture improvement request in response to an interruption notification of the driver monitoring which is acquired from the driver information grasping unit 85. For example, when most of the driver's head falls outside the detection range of the driver monitor 29 due to distortion of the driving posture (see frame-out in FIG. 5), the posture improvement request is issued. The posture improvement request is the interruption notification indicating to the driver that the detection by the driver monitor 29 is interrupted. The posture improvement request is a notification that requests the driver to improve the driving posture, such that the head returns to the detection range of the driver monitor 29. In the posture improvement request, for example, a message such as "Please take correct driving posture" is displayed on the CID 22 and is also played back by the audio device 24 inside the vehicle. When the driver improves the driving posture in response to the posture improvement request, and when the driver's head returns to the detection range of the driver monitor 29 (see frame-in in FIG. 5), the presentation control unit 88 ends the posture improvement request.

When the automated driving ECU 50b predicts that the automated driving control ends due to, for example, end of a traffic congestion section, the presentation control unit 88 requests a driving takeover request. The driving takeover request is a notification indicating to the driver that the level 3 automated driving control is scheduled to end and that the control of the driving operation needs to be transferred. In the driving takeover request, for example, a message such as "automated driving is to be canceled. Please hold the steering wheel" is displayed on at least one of the HUD 23 and the meter display 21. Further, in response to the driving takeover request, the video content played by the CID 22 is stopped.

When the level 3 automated driving control (traffic-congestion level 3) is terminated, the presentation control unit 88 issues a level 3 termination notification. The level 3 termination notification is a notification that indicates to the driver the transition from the automated driving control to the driving assistance control. In the level 3 termination notification, a message indicating the end of the automated driving, such as "automated driving canceled", is displayed on at least one of the HUD 23 and the meter display 21.

The reclining control unit 89 grasps the position of the seating surface of the driver's seat DS and the reclining angle of the backrest based on the seat information acquired from the reclining control unit 89. In addition, the reclining control unit 89 is configured to adjust the position and the reclining angle of the seating surface of the driver's seat DS by outputting a driving signal (control command) to the seat actuator 28. The reclining control unit 89 controls at least the reclining state of the driver's seat DS in the automated driving period in which the subject vehicle Am travels under the automated driving control, such that the driver is included in the detection range of the driver monitor 29. The reclining control unit 89 adjusts the reclining angle and the position of the seating surface, such that the driver is located at a predetermined position where the driver monitor 29 is enabled to implement the driver's state monitoring appropriately. The predetermined position is a position of the driver such that the head and the face of the driver are located close to the center of the detection range.

Figure 5:
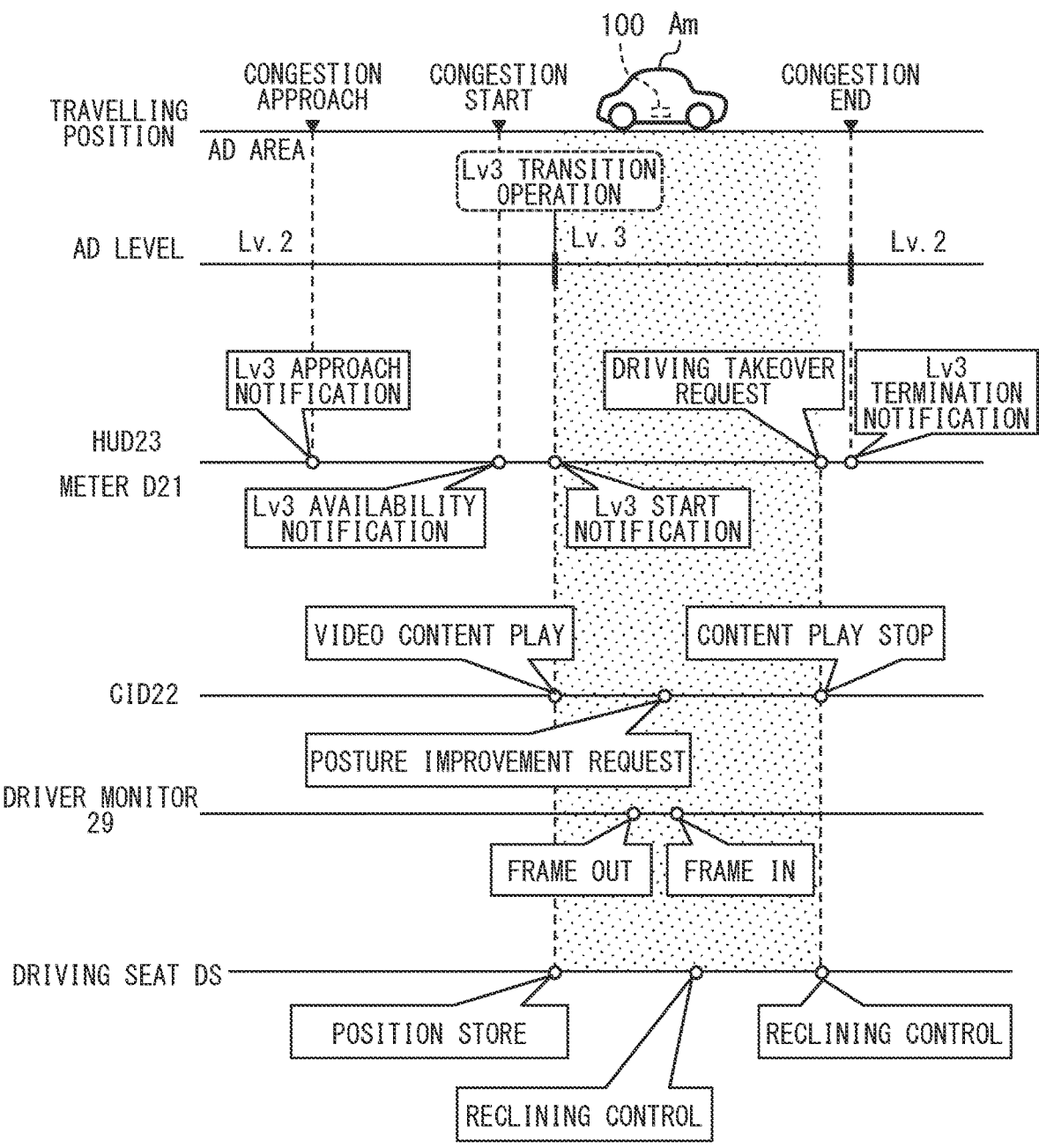
FIG. 5 is a time chart showing an example of information presentation and reclining control performed by the HCU.

The reclining control unit 89 implements reclining control of the driver's seat DS to avoid interruption of the driver monitoring in a period from issuance of the level 3 start notification, which indicates the start of the automated driving control, until the start of the driving takeover request (see the dot range in FIG. 5). The reclining control unit 89 starts the reclining control when the driver monitor 29 cannot not detect the driver or when the driver state estimation unit 86 cannot estimate the driver state. As an example, the reclining control is implemented, when the frame out of the driver's head occurs (see FIG. 5), thereafter, the driving posture of the driver does not improve by the posture improvement request, and consequently, the driver monitor 29 continues to be unable to detect the driver.

In a case where the transition schedule from the automated driving control to the driving assistance control is grasped, the reclining control unit 89 performs the reclining control at a timing at which the driving takeover request (see FIG. 5) is started. As an example, the reclining control unit 89 performs control to return the reclining state to the state before starting the automated driving control. Specifically, the reclining control unit 89 stores respective positions of the seating surface and the backrest of the driver's seat DS during the driving assistance period and implements control to return the positions and the reclining angle of the seating surface to the stored positions.

Next, details of the seat control process for implementing the reclining control will be described below based on FIG. 6 and with reference to FIGS. 2 and 5. The seat control process is started by the HCU 100, for example, in response to start of the travelling under the driving assistance control.

In S101, the information cooperation unit 82 grasps whether the subject vehicle Am travels under the automated driving control without obligation to monitor the surroundings and determines whether the automated driving control is started. When it is determined in S101 that traveling under the automated driving control is to be started, the process proceeds to S102.

In S102, the reclining control unit 89 stores the reclining position or the like before starting the automated driving control based on the seat information acquired from the seat actuator 28. The process proceeds to S103. Note that, the process of storing the reclining position or the like may be performed in a period from issuance of the level 3 available notification until issuance of the level 3 start notification.

In S103, the information cooperation unit 82 determines whether the schedule to end the level 3 automated driving control exists. When it is determined in S103 that the schedule to end the automated driving control exists, in other words, when it is determined that a schedule of transition to the level 2 driving assistance control or lower or a manual driving exists, the process proceeds to S104.

In S104, the driver state estimation unit 86 determines whether the driving posture is appropriate or not. The condition for determining the driving posture in S104 may be made stricter than the condition for determining the driving posture in S106, which will be described later. When it is determined in S104 that the driver's head is positioned appropriately within the detection range of the driver monitor 29, the seat control process ends. On the other hand, when most of the driver's head is out of the detection range of the driver monitor 29, or when the face of the driver is directed downward, it is determined that the driving posture is inappropriate, and the process proceeds to S105.

In S105, the reclining control unit 89 implements the reclining control. In S105, the information stored in S102 is read out, and the respective positions in the driver's seat DS are adjusted to be in the state before the level 3 automated driving control is started. Upon completion of the reclining control, the seat control process ends.

On the other hand, when it is determined in S103 that the schedule to transit to the driving assistance control or the manual driving does not exist and that the level 3 automated driving control is to be continued, the process advances to S106. Also in S106, the determination whether the driving posture is appropriate or not is made. In S106, the driver information grasping unit 85 grasps the state in which the driver monitoring by the driver monitor 29 continues, and determines whether the frame out of the driver's head from the detection range of the driver monitor 29 occurs. When it is determined in S106 that the driver's head is located within the detection range, the process proceeds to S110. On the other hand, when it is determined in S106 that most of the driver's head is outside the detection range, the process proceeds to S107. In S107, the presentation control unit 88 starts the posture improvement request to indicate that the driver monitor 29 is unable to recognize the driver.

In S108, it is determined whether the driver has improved the driving posture in response to the posture improvement request. When it is determined in S108 that the driver's driving posture has been improved and that the driver's head is located approximately at the center of the detection range, the process proceeds to S110. On the other hand, when it is determined in S108 that the driving posture has not been improved and that interruption of the driver monitoring continues, the process proceeds to S109.

In S109, the reclining control unit 89 controls the reclining state of the driver's seat DS such that the detection range of the driver monitor 29 includes the driver's head. The reclining control in S109 may control to return the position and the reclining angle of the seating surface to the respective positions stored in S102, similarly to the reclining control in S105. Alternatively, the reclining control unit 89 may implement reclining control to position the driver's head at the center of the detection range with reference to the position information of the driver's head grasped by the driver state estimation unit 86.

Herein, when interruption of the driver monitoring continues in S109 although the reclining control is implemented, the automated driving ECU 50b determines that it is difficult to continue the level 3 automated driving control and starts transition to MRM (Minimal Risk Maneuver) control. The MRM control is automated evacuation control that sets, as an evacuation place, a place in the lane on which the vehicle travels or the roadside (shoulder) in the road on which the vehicle travels and stops the subject vehicle Am at the evacuation place.

In S110, the information cooperation unit 82 determines whether the level 3 automated driving control is terminated. When it is determined in S110 that the automated driving control is to be continued, the process returns to S103. On the other hand, when it is determined in S110 that the automated driving control is to be terminated, the current seat control process is terminated.

In the present embodiment described so far, the reclining state of the driver's seat DS is controlled such that the driver is included in the detection range of the driver monitor 29. Therefore, even when the driver who has been released from the obligation to monitor the surroundings loses the driving posture, the driver is enabled to remain within the detection range of the driver monitor 29 by the reclining control. As a result, the configuration enables to suppress interruption of the driver state monitoring in the automated driving period in which obligation to monitor the surroundings does not exist.

The above configuration enables to avoid a situation where the automated driving control is forcibly terminated and where transition to the MRM control is started, due to the inappropriate driving posture. In other words, the configuration facilitates to continue the level 3 automated driving. Therefore, the reclining control of the present embodiment is capable of contributing to improving the convenience of the automated driving.

In addition, the present embodiment controls the reclining state of the driver's seat DS when the start of the automated driving control is detected, such that the driver is located at the predetermined position where the driver monitor 29 is capable of implementing the driver's state monitoring appropriately. The above configuration further enables to suppress interruption of the driver monitoring after the start of the level 3 automated driving.

Furthermore, the present embodiment implements the reclining control to return the reclining state to the state before the start of the automated driving control, when the schedule to transition from the automated driving control to the driving assistance control is grasped. The configuration enables, when takeover of the driving is implemented, the driver to smoothly start monitoring of the surroundings of the subject vehicle.

Furthermore, the present embodiment starts the reclining control by the reclining control unit 89, when the state in which the driver monitor 29 is unable to detect the driver continues even after the posture improvement request is issued. The configuration enables to avoid causing of anxiety, discomfort, and the like to the driver due to sudden implementation of the reclining control.

In addition, the present embodiment estimates the driver's state by combining the head information and the face information, when the subject vehicle Am travels under the automated driving control. Therefore, even when the driver, who has been released from the obligation of monitoring the surroundings, looks down to operate a mobile device and the like, the face information, which is hardly grasped, can be supplemented with the head information. As a result, the configuration enables to suppress interruption of the driver state monitoring in the automated driving period in which obligation to monitor the surroundings does not exist.

Further, the driver state estimation unit 86 of the present embodiment changes the weighting of the head information and the face information in the driver state estimation between the case where the subject vehicle Am travels under the driving assistance control that obliges the surrounding monitoring and the case where the subject vehicle Am travels under the automated driving control. Therefore, the state of the driver who is monitoring the surroundings and the state of the driver who is not monitoring the surroundings can be estimated by appropriately processing for the respective states. Therefore, the accuracy of estimating the driver state can be improved.

Furthermore, in the present embodiment, when the subject vehicle Am travels under the automated driving control, the weighing of the head information in the driver state estimation is increased to be higher than the weighing of the head information when the subject vehicle Am travels under the driving assistance control. Therefore, the accuracy of the driver state estimation can be ensured even in the automated driving period in which the face information is hardly extracted.

In addition, in this embodiment, the reclining state of the driver's seat DS is controlled such that the head is located in the detection range of the driver monitor 29 when the driver state estimation is interrupted. As described above, the configuration enables to further suppress interruption of the driver state monitoring by combining the complementation of the face information with the head information and the reclining control.

In the above embodiment, the information cooperation unit 82 corresponds to a "control grasping unit", the driver information grasping unit 85 corresponds to a "monitoring state grasping unit", the presentation control unit 88 corresponds to a "notification control unit", and the HCU 100 corresponds to a "seat control device" and a "state estimation device". Further, the posture improvement request corresponds to an "interruption notification".

(Other Embodiments)

Although one embodiment of the present disclosure has been described above, the present disclosure is not construed as being limited to the above-mentioned embodiments, and can be applied to various embodiments and combinations within a scope that does not depart from the spirit of the present disclosure.

In the reclining control of the embodiment described above, both the position of the seating surface and the reclining angle are the adjusted object. On the other hand, in a first modification of the above embodiment, only the reclining angle is the adjusted object in the reclining control. Further, as a driving position control in conjunction with the reclining control, the position of the steering wheel, and the like may be adjusted together with the reclining angle.

In the reclining control of the embodiment described above, the adjustment to return the state of the driver's seat DS to the position stored at the time of the transition to the automated driving control is implemented. On the other hand, in a second modification of the above embodiment, the reclining control is implemented to limit respective adjustment ranges of the position of the seating surface and the reclining angle so that the driver's head does not fall out of the detection range.

In third and fourth modifications of the above embodiment, the process of storing the position at the time of the transition to level 3 is omitted. In the third modification, a reference state is set in advance such that the driver is to be located at a predetermined position where the state can be monitored appropriately. The reclining control unit 89 implements the reclining control to adjust the reclining angle and the like to the reference state. In the fourth modification, the reclining control is performed to adjust the reclining angle and the like with reference to the information extracted from the driver image, such that the driver's face is located at the center of the detection range.

In the fifth modification of the above embodiment, issuance of the posture improvement request is omitted. In the firth modification, the reclining control is immediately started in response to interruption of the driver monitoring by the driver monitor 29. In the sixth modification of the above embodiment, the reclining control is performed simultaneously with the posture improvement request.

In the above embodiment, the driver's head information is also used to estimate the driver's state in the driving assistance period. On the other hand, in the seventh modification of the above embodiment, the driver's state estimation in the driving assistance period is performed using only the driver's face information. Furthermore, the driver state estimation in the automated driving period is implemented using only the driver's head information.

The HCU 100 of the above embodiment is capable of estimating the driver's state even in the driving assistance control at the automated driving of level 1 or in the manual driving. The driver state estimation unit 86 may select the setting of the weighting for the level 2 under the level 1 driving assistance control or under the manual driving, or may select the setting of the weighting different from that for level 2.

Figure 6:
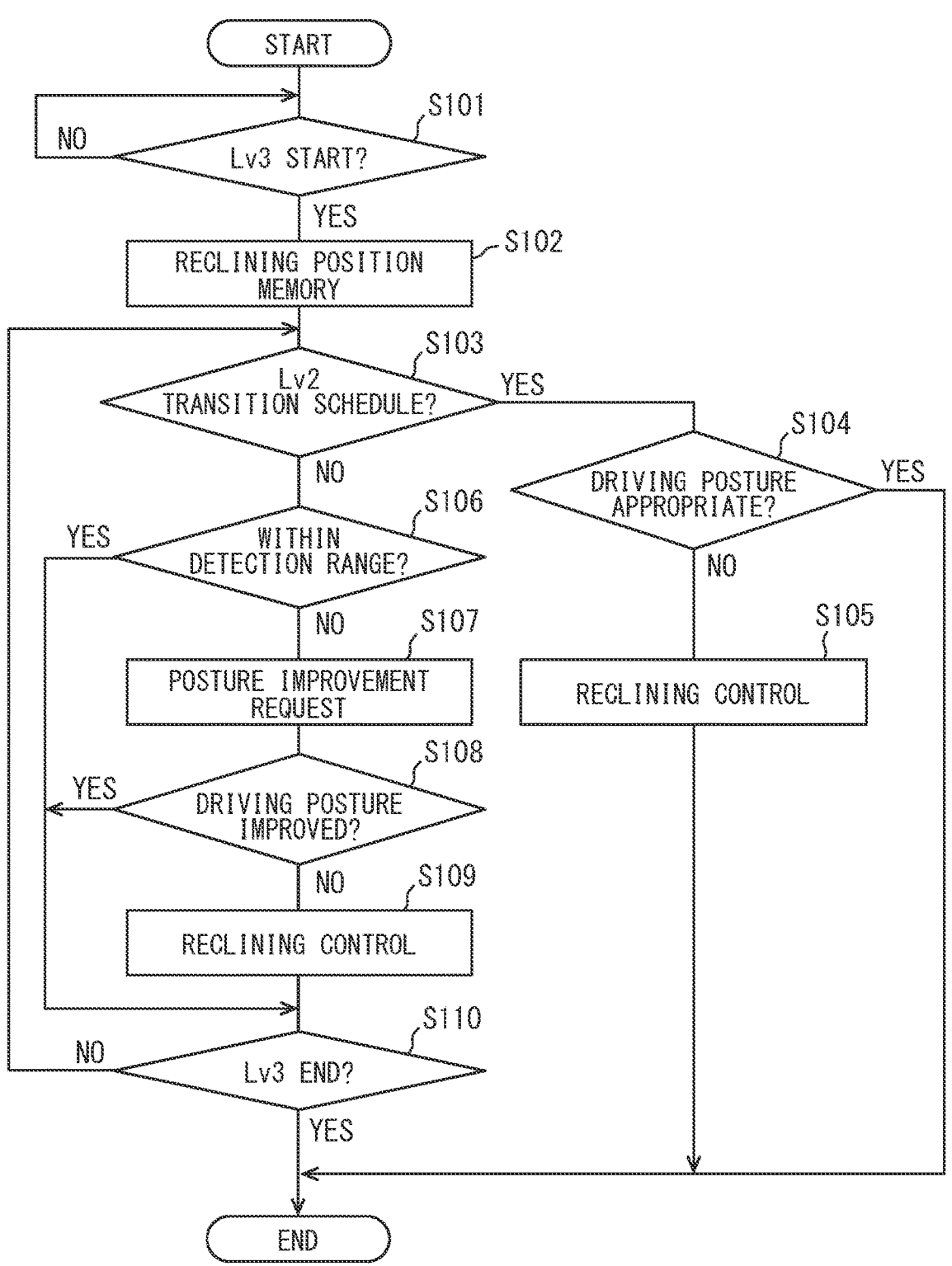
FIG. 6 is a flowchart showing details of a seat control process.

In the above embodiment, the criteria for determining whether the driving posture is appropriate or not at the end of level 3 (see S104 in FIG. 6) as scheduled is stricter than the criteria for determining whether the driving posture is appropriate or not in the period in which the level 3 continues (see S106 in FIG. 6). However, the criteria used at the end of level 3 as scheduled and the criteria used in the period in which the level 3 continues may be substantially the same. Furthermore, the criteria used in the period in which the level 3 continues may be stricter than the criteria used at the end of the level 3 as scheduled.

In the above embodiment, the respective functions of the seat control device and the state estimation device installed in the HCU 100 may be implemented by an in-vehicle ECU that is other than the HCU 100. For example, the function of the seat control device may be implemented by the driving assistance ECU 50*a*, the automated driving ECU 50*b*, the control unit of the seat actuator 28, and/or the like. Further, the function of the state estimation device may be implemented by the driving assistance ECU 50*a*, the automated driving ECU 50*b*, the control unit of the driver monitor 29, and/or the like. Furthermore, the function of the state estimation device may be implemented by a dead man determining device provided separately from the driver monitor 29. Moreover, the respective functions of the seat control device and the state estimation device may be implemented by a plurality of ECUs. In these embodiments, a system implementing a plurality of ECUs corresponds to a "seat control device" and a "state estimation device."

The automated driving ECU 50*b* may be configured to perform automated driving control in a driving control mode different from the traffic-congestion level 3, such as area-limited control (hereinafter referred to as area level 3) that is performed only within a specific area. The automated driving ECU 50*b* may perform automated driving control at Level 4 or higher.

In an eighth modification of the above embodiment, the respective functions of the automated driving ECU 50*b* and the HCU 100 are implemented by one in-vehicle ECU. In the eighth modification, the in-vehicle ECU that serves as both the automated driving ECU 50*b* and the HCU 100 corresponds to the "seat control device" and the "state estimation device."

In the aforementioned embodiments, the respective functions provided by the HCU can be also provided by software and hardware for executing the software, only software, only hardware, and complex combinations of software and hardware. Furthermore, in a case where such function is provided by an electronic circuit as hardware, each function can also be provided by a digital circuit including a large number of logic circuits or an analog circuit.

Each processing unit according to the above-described embodiments may be individually mounted on a printed circuit board, or may be mounted on an application specific integrated circuit (ASIC), an FPGA, or the like. The configuration of the storage medium (non-transitory tangible computer-readable storage medium or non-transitory tangible storage medium) that stores various program may be changed as appropriate. Further, the storage medium is not limited to the configuration provided on the circuit board, and may be provided in the form of a memory card or the like. The storage medium may be inserted into a slot portion, and electrically connected to the control circuit of the automated driving ECU or the control circuit of the HCU. Further, the storage medium may include an optical disk which forms a source of programs to be copied into the automated driving ECU or the HCU, or a hard disk drive therefor.

The vehicle on which the automated driving system and the HMI system are mounted is not limited to a general passenger vehicle for private use, and may be a rental vehicle, a manned taxi vehicle, a ride-sharing vehicle, a cargo vehicle, a bus, or the like. The vehicle on which the automated driving system and the HMI system are mounted may be a right-hand drive vehicle or a left-hand drive vehicle. Additionally, a traffic environment in which the vehicle travels may be a traffic environment on a premise of left-hand traffic or a traffic environment on a premise of right-hand traffic. The seat control and the driver state estimation according to the present disclosure may be optimized according to the road traffic laws of respective countries and regions, and further according to the position of the vehicle's steering wheel, and the like.

The control unit and the method thereof described in the present disclosure may be realized by a dedicated computer constituting a processor programmed to execute one or a plurality of functions embodied by a computer program. Alternatively, the device and the method thereof described in the present disclosure may be implemented by a dedicated hardware logic circuit. Alternatively, the device and the method thereof described in the present disclosure may be implemented by one or more dedicated computers configured by a combination of a processor executing a computer program and one or more hardware logic circuits. The computer programs may be stored, as instructions to be executed by a computer, in a tangible non-transitory computer-readable medium.

What is claimed is:

1. A seat control device for a subject vehicle equipped with a driver monitor to monitor a driver's state, the seat control device configured to control a state of a driver's seat on which a driver is to be seated, the seat control device comprising:

a control grasping unit configured to grasp whether the subject vehicle travels under an automated driving control that does not oblige the driver to monitor surroundings; and a reclining control unit configured to, when the subject vehicle travels under the automated driving control, implement a control of a reclining state of the driver's seat, such that the driver is included in a detection range of the driver monitor;

wherein the reclining control unit is further configured to:

implement the control of the reclining state of the driver's seat when a transition schedule from the automated driving control to a driving assistance control that obliges the driver to monitor the surroundings is grasped and the driver is not included in the detection range of the driver monitor;

request posture improvement to the driver such that the driver is included in the detection range of the driver monitor when the transition schedule from the automated driving control to the driving assistance control is not grasped; and subsequently implement the control of the reclining state of the driver's seat when the driver is not included in the detection range of the driver monitor.

2. The seat control device according to claim 1, wherein the reclining control unit is configured to, when start of the automated driving control is grasped, control the reclining state, such that the driver is at a predetermined position at which the driver monitor is capable of appropriately monitoring the driver's state.

3. The seat control device according to claim 1, wherein the control grasping unit is configured to grasp a transition schedule from the automated driving control to a driving assistance control that obliges the driver to monitor the surroundings, and the reclining control unit is configured to, when the transition schedule from the automated driving control to the driving assistance control is grasped, implement a control to return the reclining state to a state before start of the automated driving control.

4. The seat control device according to claim 1, further comprising:

a monitoring state grasping unit configured to grasp whether the driver monitor is capable of detecting the driver; and a notification control unit configured to, when the driver monitor is incapable of detecting the driver, implement an interruption notification that indicates interruption of detection of the driver monitor to the driver, wherein the reclining control unit is configured to start a reclining control, when a state in which the driver monitor is incapable of detecting the driver continues after the interruption notification.

5. A non-transitory computer-readable medium storing a seat control program for a subject vehicle equipped with a driver monitor to monitor a driver's state, the seat control program configured to control a state of a driver's seat on which a driver is to be seated, the seat control program comprising instructions configured to, when executed by a processor, cause the processor to:

grasp whether the subject vehicle travels under an automated driving control that does not oblige the driver to monitor surroundings;

implement a control of a reclining state of the driver's seat when the subject vehicle travels under the automated driving control, such that the driver is included in a detection range of the driver monitor;

implement the control of the reclining state of the driver's seat, when a transition schedule from the automated driving control to a driving assistance control that obliges the driver to monitor the surroundings is grasped and the driver is not included in the detection range of the driver monitor; and request posture improvement to the driver such that the driver is included in the detection range of the driver monitor when the transition schedule from the automated driving control to the driving assistance control is not grasped; and subsequently implement the control of the reclining state of the driver's seat, when the driver is not included in the detection range of the driver monitor.

6. A state estimation device for a subject vehicle configured to travel under an automated driving control that does not oblige a driver to monitor surroundings, the state estimation device configured to estimate a driver's state and comprising:

a monitoring state grasping unit configured to grasp, based on a driver captured image acquired by capturing a detection range defined to include at least a head of the driver seated on a driver's seat, head information, which relates to a shape of a head in the driver captured image, and face information, which relates to parts of a face in the driver captured image; and a driver state estimation unit configured to, estimate the driver's state by combining the head information and the face information;

wherein the driver state estimation unit is configured to change weighting of the head information and the face information in estimating of the driver's state between a case in which the vehicle travels under a driving assistance control that obliges the driver to monitor surroundings, and a case in which the subject vehicle travels under the automated driving control.

7. The state estimation device according to claim 6, wherein the driver state estimation unit is configured to increase a weight of the head information in estimating of the driver's state when the subject vehicle travels under the automated driving control more than the weight of the head information when the subject vehicle travels under the driving assistance control.

8. The state estimation device according to claim 6, further comprising:

a reclining control unit configured to, when estimation of the driver's state is interrupted, control a reclining state of the driver's seat, such that the head is located in the detection range.

9. A non-transitory computer-readable medium storing a state estimation program for a subject vehicle configured to travel under an automated driving control that does not oblige a driver to monitor surroundings, the state estimation program configured to estimate a driver's state, the state estimation program comprising instructions configured to, when executed by a processor, cause the processor to:

grasp, based on a driver captured image acquired by capturing a detection range defined to include at least a head of the driver seated on the driver's seat, head information, which relates to a shape of a head in the driver captured image, and face information, which relates to parts of a face in the driver captured image;

estimate a state of the driver by combining the head information and the face information; and change weighting of the head information and the face information in estimating of the driver's state between a case in which the vehicle travels under a driving assistance control that obliges the driver to monitor surroundings and a case in which the subject vehicle travels under the automated driving control.

10. The seat control device according to claim 1, further comprising:

a monitoring state grasping unit configured to grasp whether the driver monitor is capable of monitoring the driver in an automated driving period in which the subject vehicle travels under the automated driving control, wherein the reclining control unit is configured to, when the driver monitor is incapable of detecting the driver in the automated driving period, control the reclining state of the driver's seat, such that the driver is included in the detection range of the driver monitor.

11. The seat control device according to claim 1, wherein the reclining control unit is configured to, when a transition schedule from the automated driving control to a driving assistance control, which obliges the driver to monitor the surroundings, is grasped, set a criteria, which is for determining whether to control the reclining state, stricter than the criteria when the transition schedule is not grasped.

12. The non-transitory computer-readable medium according to claim 5, wherein the instructions further configured to, when executed by the processor, cause the processor to:

grasp whether the driver monitor is capable of monitoring the driver in an automated driving period in which the subject vehicle travels under the automated driving control; and control, when the driver monitor is incapable of detecting the driver in the automated driving period, the reclining state of the driver's seat, such that the driver is included in the detection range of the driver monitor.

13. The non-transitory computer-readable medium according to claim 5, wherein the instructions further configured to, when executed by the processor, cause the processor to:

set, when a transition schedule from the automated driving control to a driving assistance control, which obliges the driver to monitor the surroundings, is grasped, a criteria, which is for determining whether to control the reclining state, stricter than the criteria when the transition schedule is not grasped.

\* \* \* \* \*